Jan. 5, 1926.

C. H. LAND, JR
SEMITRAILER
Filed Feb. 8, 1924

Inventor
Charles H. Land, Jr.
By Stuart C. Barnes
Attorney

Jan. 5, 1926.

C. H. LAND, JR
SEMITRAILER
Filed Feb. 8, 1924

Jan. 5, 1926. 1,568,560
C. H. LAND, JR
SEMITRAILER
Filed Feb. 8, 1924 7 Sheets-Sheet 5

Inventor
Charles H. Land, Jr.
By Stuart C. Barnes
Attorney

Patented Jan. 5, 1926.

1,568,560

UNITED STATES PATENT OFFICE.

CHARLES H. LAND, JR., OF DETROIT, MICHIGAN.

SEMITRAILER.

Application filed February 8, 1924. Serial No. 691,342.

REISSUED

*To all whom it may concern:*

Be it known that CHARLES H. LAND, Jr., a citizen of the United States, residing at Detroit, in the county of Wayne and State of Michigan, has invented certain new and useful Improvements in Semitrailers, of which the following is a specification.

This invention relates to semi-trailers. The subject matter of the invention may be classified as follows:

Wheels are provided on the trailer frame near the front end for running up the inclined approach to the horizontal tracks on the truck when the truck backs into the trailer, and means are provided for automatically raising these wheels off the horizontal portion of the tracks when the trailer is in its final position on the tractor.

When the tractor backs into the semi-trailer, the latch hooks are automatically positioned to engage with the locking bar on the truck. This is accomplished by the supporting unit swinging from its forward position to a vertical position during the travel on the truck tracks of the wheels on the front end of the trailer frame.

The construction of the automatic means for raising the supporting element of the trailer when the truck drives into the trailer involves a new arrangement whereby the actuating connection is near the fulcrum of the swinging supporting element so that only a small amount of movement is required to lift the supporting element even if greater power is required, distance being considered more important here than power which is proportionately large due to the heavy truck.

The brake which has been set in position prior to the time when the truck backs into the trailer is automatically released by the truck at the proper time.

When the truck starts out from under the trailer, it first draws the legs into position and automatically locks them in this position before the uncoupling movement takes place.

Provision is made so that the truck cannot uncouple from the trailer until the legs of the supporting elements are locked in their upright position, the uncoupling being prevented prior to the locking of said legs in position but allowed to uncouple subsequently.

Mechanism is provided which may be operated from the cab of the truck for blocking an override brake mechanism to permit backing without setting the brakes.

The coupling head involves new and novel devices, one of which is an arrangement to release the locking pin located in the coupling head from the strain incident to the momentum of the truck when the locking pin drops into place.

There are other features of novelty, but this in a general way summarizes the features to which the claims are directed.

The apparatus is somewhat difficult to understand and follow due to the large number of relative changes that occur in performing the automatic functions outlined above. It is therefore thought that the easiest way to approach and describe the matter is to describe the operation and the parts together, beginning with the truck backing into the semi-trailer.

Figure 2:
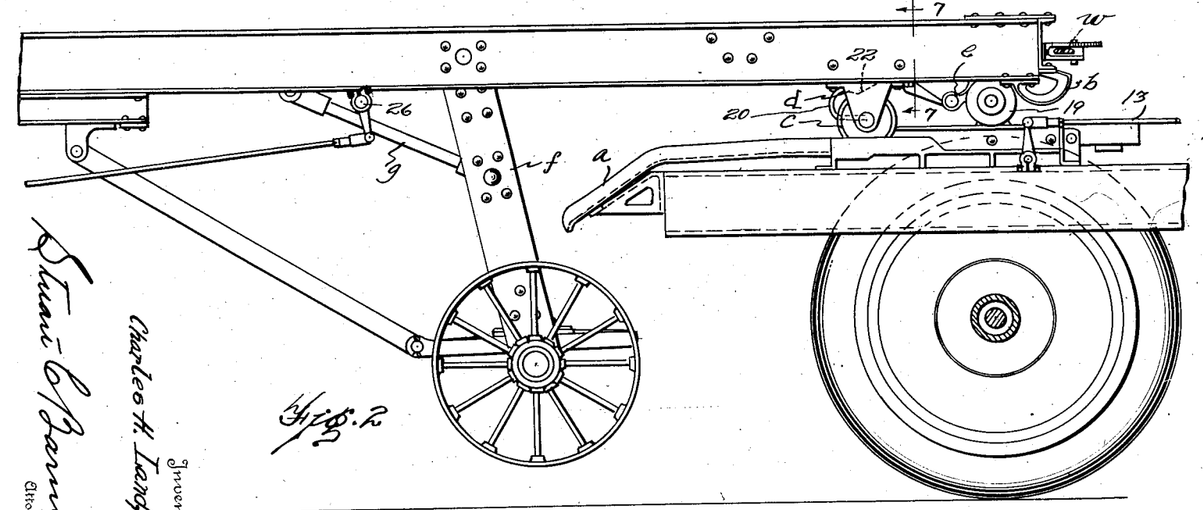
Fig. 2 is a side elevation of the same parts showing the parts in the same position.
Figure 3:
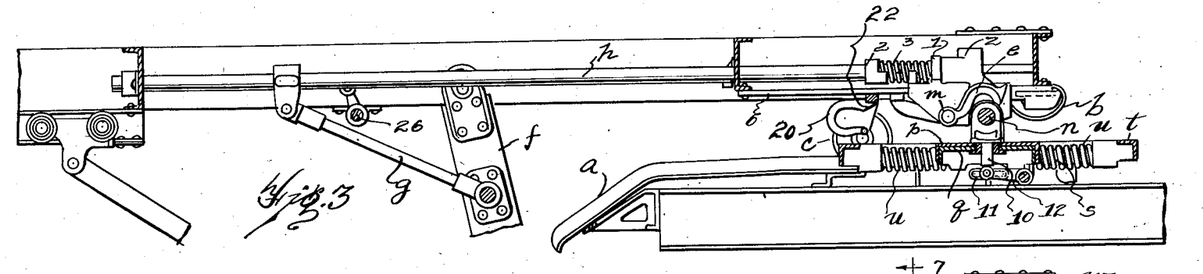
Fig. 3 is a fragmentary longitudinal section of the same parts.
Figure 14:
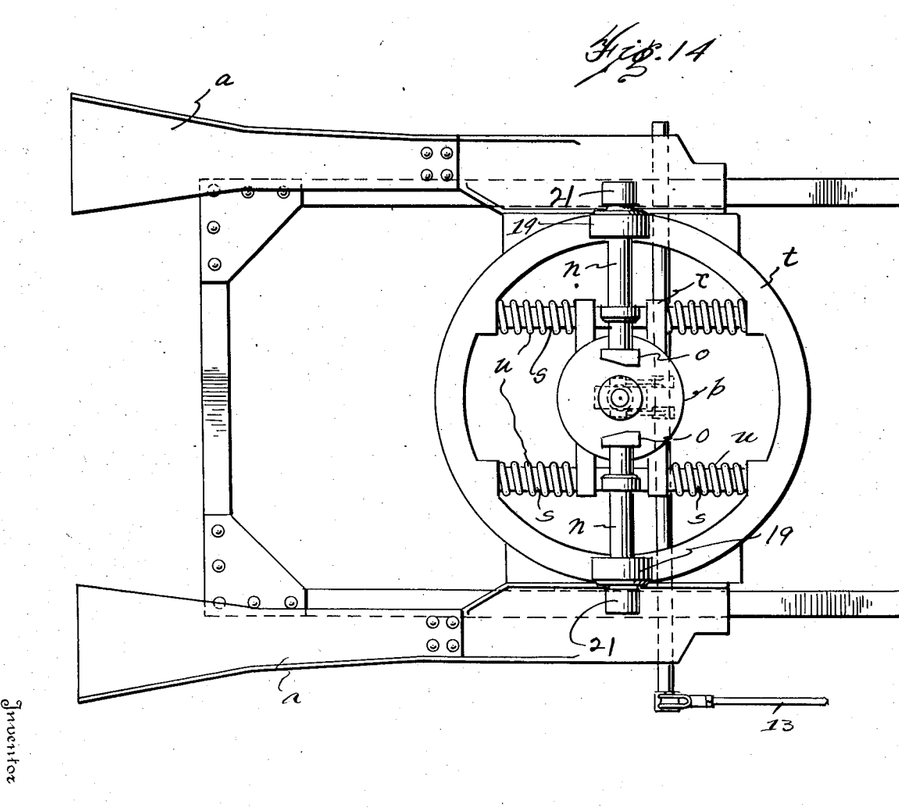
Fig. 14 is a plan view of the rear of the truck.

In the plan view of the back of the truck shown in Fig. 14, will be seen the tracks $a$ which are inclined as shown in Figs. 2 and 3, in the manner set forth and claimed in the Pescatore Patent No. 1,084,820. A pair of bumper loops $b$ (Figs. 2 and 3) are provided on the front of the trailer for first striking the inclined track and taking the shock on the trailer. As the inclined track backs further it strikes the rollers $c$ supported on the bottom of the side sills of the trailer by the brackets $d$. This, of course, greatly facilitates the truck running under the trailer and lifting the same.

Figure 1:
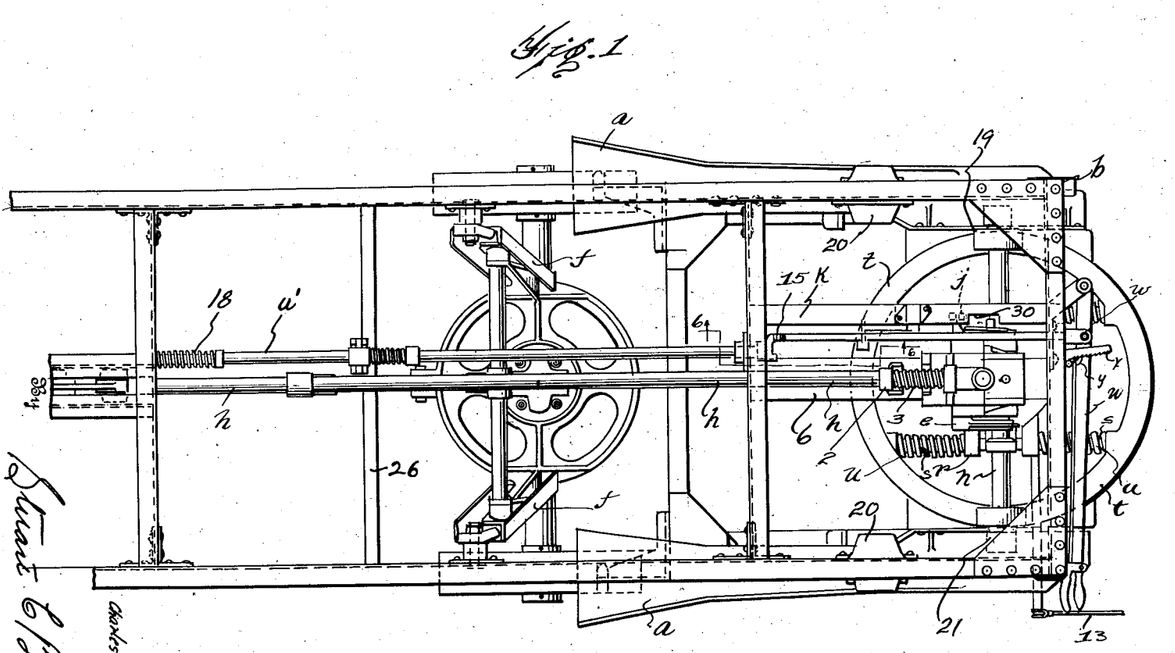
Fig. 1 is a plan view of the trailer and the rear portion of the truck including the fifth wheel. The parts are shown before the truck has backed all the way into the trailer.
Figures 9, 10, 11:
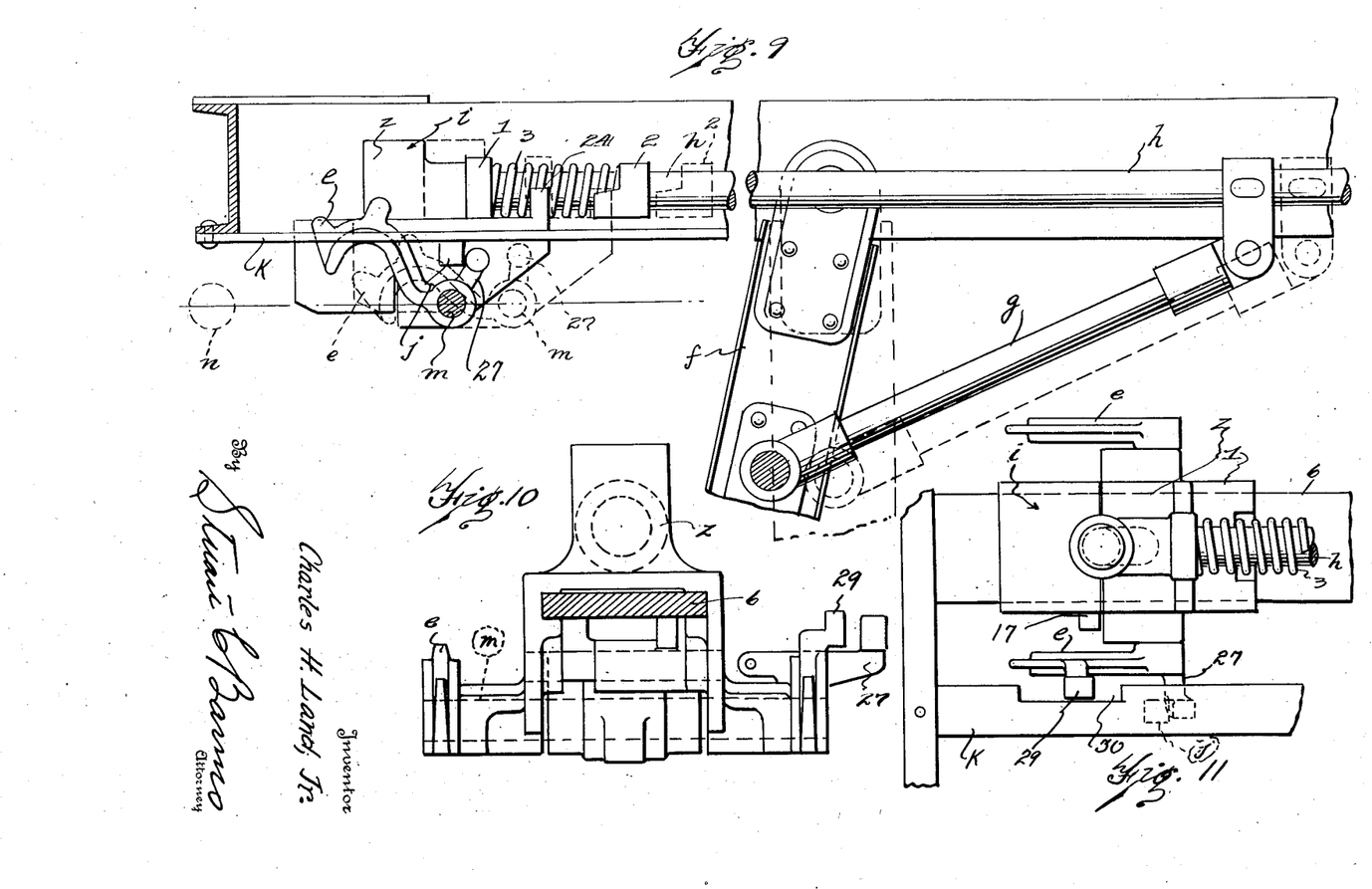
Fig. 9 is a longitudinal section through the forward part of the trailer when tractor is entirely away showing by dotted lines how the drop of the supporting legs serves to position the latch hooks in the path of the lock bar of the truck, after impact of bumper loops but before final coupling.
Fig. 10 is a front elevation of the coupling head.
Fig. 11 is a plan view of the same.

Refer to Fig. 9. When the truck has previously uncoupled itself from the trailer, it has left the latch hooks $e$ in the raised position shown by the full lines. However, as soon as the truck raises the trailer off the ground by backing under it as shown in Figs. 2 and 3, the forwardly inclined legs $f$ of the supporting element swing from the full line position shown in Fig. 9, to the dotted line position,—that is, down to the vertical. The legs are connected by the link $g$ to the sliding bar $h$. This sliding bar is connected at the front with a coupling head $i$ on which are pivoted the two bell crank-like latch hooks $e$. These latch hooks were left held in their lifted position by reason of the tail engaging the lug $j$ on the bottom of the bar $k$, which extends from the front cross channel to the first intermediate channel of the trailer frame (Fig. 1; compare also Fig. 11). This backward movement of the sliding bar $h$ permits the two latch hooks which are connected by the shaft $m$ (Fig. 10) to drop down into the dotted line position shown in Fig. 9. The bill of the latch hook is inclined so that when the lock bar $n$, shown in dotted lines in Fig. 9, strikes the inclined bill it throws the swinging latch upwardly and passes under it and into the gullet of the latch which drops back upon the lock bar by gravity. This is illustrated in Fig. 3. There are two of these lock bars $n$ (see Fig. 14). They are supported on the upstanding lugs $o$ of the cap plate $p$ in the center of the fifth wheel of the truck. This cap plate $p$ is shown in Fig. 3 and is the upper cap plate, while the lower cap plate $q$ carries the projecting lugs $r$ (Fig. 14) which are four in number, and which slide on the rods $s$ that bridge the circular track $t$ from front to back. Four spacing springs $u$ are coiled about these rods and abut against the projecting lugs $r$. This arrangement gives the two center cap plates a floating action with respect to the larger circular track so that there may be a slight yield and play in the coupling of the trailer to the truck, so as to absorb the shocks.

When we left the truck and trailer, the hooks had dropped over the locking bar end, but the supporting legs are still in their upright position, having swung down to the vertical. Now, it is desirable to automatically lift these legs out of the way and provide an automatic release for the brake which will be set by hand before the truck is backed into the trailer. This brake is operated by a brake rod $u'$ that runs to the front of the trailer where it connects with the brake lever $w$, which operates in connection with the usual toothed segment $x$ and pawl $y$ (see Fig. 1).

It becomes necessary here to make a slight digression and describe the coupling head and the sliding element which serves to perform a number of the automatic operations such as lifting the supporting legs and drawing them down into a vertical position, releasing the brake, and some of the other operations. This coupling head is detailed in Fig. 4. The sliding element is the rod $h$. The coupling head is a two-part member comprising the pin-holding casting $z$ and the hook-carrying-casting 1. An abutment collar 2, is pinned to the sliding element $h$, and a coiled spring 3 yieldingly spaces the latch-hook-carrying casting 1, and yieldingly forces it against the pin-holding casting $z$. The latter is pinned to the end of the sliding bar $h$. Secured to the pin holding casting $z$ of the coupling head is a lever 4, adapted to abut against the lower end of the tapered locking pin 5, when raised. A locking bar 6 extends from the front cross channel bar to the first intermediate cross channel bar of the trailer frame (see also Fig. 1). This has an elongated slot 7, in its forward end and a small opening 8 to the rear of this.

Figure 4:
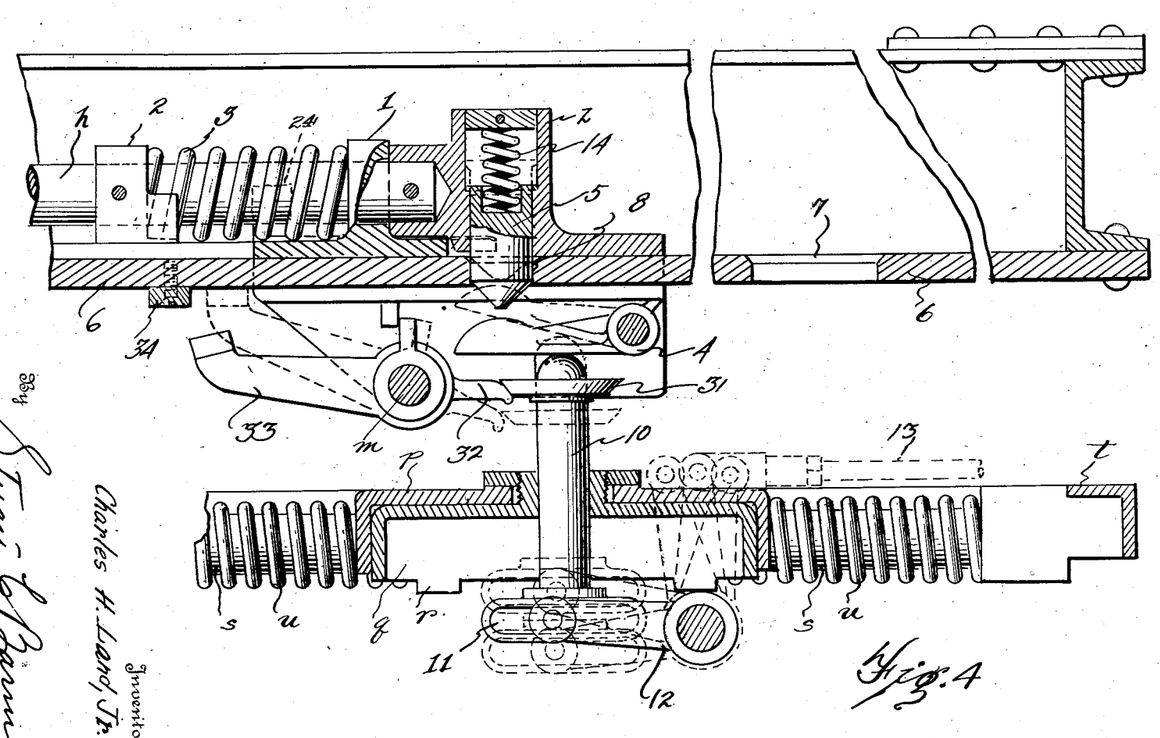
Fig. 4 is a longitudinal section through a portion of the fifth wheel on the truck and the coupling head on the trailer.

When the supporting legs $f$ are in their extreme forward position such as shown in Fig. 2, the pin 5 rests in the forward end of this slot 7. The length of the slot permits the movement already referred to and illustrated in Fig. 9, where the legs drop from the forward inclined position to the vertical position for the purpose of positioning the latch hooks. In the condition that we left the trailer and truck, the latch hooks had engaged with the lock bar and the trailer and truck were coupled together, but the supporting legs had not been drawn up nor the brakes released. This can only be effected by the travel of the sliding element, coupling head and truck backwardly with respect to the trailer while the trailer remains stationary. But, as we have already seen, these parts are locked against this movement by reason of the pin 5 (Fig. 4) being at this time located in the slot 7. However, the fifth wheel of the truck being coupled up with the coupling head of the trailer by reason of the latch hooks engaging over the lock bar that is carried by the fifth wheel, the stud 10 is directly under the lever 4. This stud 10 passes through the center of the fifth wheel. Its lower end is enlarged and slotted as at 11, and this slot is connected with a lever 12 of the bell crank type, which is connected by the rod 13 with the driver's cab, not shown. By pulling forward on this rod 13, the lower arm of the lever is raised. This raises the stud 10 and the lever 4, which encounters the lower end of the tapered locking pin and thrusts it up against the force of the spring 14. The upper edges of both the holes 7 and 8 in the lock bar are beveled off as shown in Fig. 4. This lever 4 rises to the dotted line position shown in Fig. 4, and lifts the pin to the dotted line position shown in Fig. 4, but bear in mind the whole coupling head and pin are now in the elongated slot 7. This releases the sliding elements of the trailer, to wit: the coupling head and the sliding bar, so that they are free now to move relatively backward with respect to the trailer to accomplish the results now to be described.

The driver of the truck now backs up the truck slightly. The truck together with the sliding elements on the trailer move backwardly. The tapered end of the locking pin in connection with the beveled edge of the slots serving to cause the locking pin to climb out of the slot. The parts continue their relative movement along the locking bar until the opening 8 of the locking bar is reached by the locking pin 5. When it registers with this opening, the helical spring 14 causes it to shoot into this opening. If this were to immediately arrest the truck, the pin would likely shear, but this is nicely taken care of by the inertia resisting arrangement afforded by the making of the coupling head in two pieces, carrying the pin on the casting 2 and the coupling hooks on the casting 1. The consequence is that the coil spring 3 allows these two parts of the coupling head to separate slightly so that the inertia of the truck may be stopped by the spring 3 in a gradual fashion rather than by being suddenly arrested by the pin 5. In short, this constitutes a nicely arranged spring buffer in the coupler to prevent the shearing of the pin 5.

Figures 5, 6, 7, 8, 15:
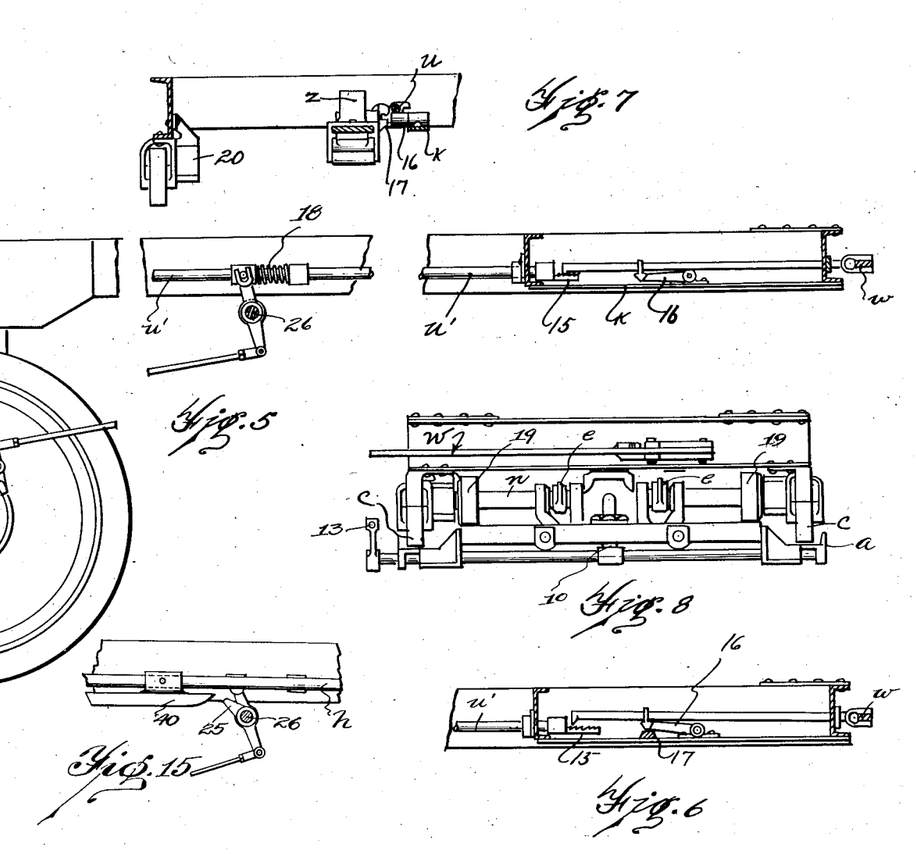
Fig. 5 is a longitudinal section of the trailer showing the brake operating connections.
Fig. 6 is a section taken on the line 6—6 of Fig. 1.
Fig. 7 is a section taken on the line 7—7 of Fig. 2.
Fig. 8 is a front elevation of a trailer and the fifth wheel part of the truck, showing the trailer wheels as raised slightly off the track carried by the truck.
Fig. 15 is a detail showing means for setting the brake as the truck pulls away from the trailer.
Figure 13:
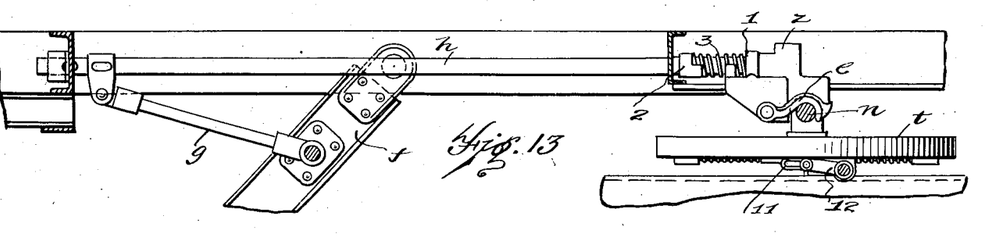
Fig. 13 is a longitudinal section of the trailer and the rear part of the truck parts being omitted for clearness, showing the parts when in position for transport as distinguished from Fig. 3, which shows the parts in the act of coupling.

This relative movement of the sliding elements on the trailer accomplishes these results: it forces the sliding bar $h$ to the rear. Refer to Fig. 3. The sliding bar is connected by the link $g$ with the supporting legs $f$. This connection is made as close to the fulcrum of the legs as possible so that a minimum amount of travel of the bar $h$ will be required to swing the legs up to their folded position, such as shown in Fig. 13. This is one result. The second result is that the sliding bar releases the brakes. Refer to Fig. 5. The brake rod $u'$ is divided into a front and rear half connected by the toothed portion 15; on the bar $k$ is supported the brake releasing lever 16, in an eye of which is guided the brake rod $u$ (see Fig. 5 and Fig. 7). On the coupling head is a lever tripping lug 17. As the sliding elements reach the rear end of their travel this lug 17 strikes this brake releasing lever 16, as shown in Fig. 6, and lifts up the forward portion of the brake rod, disengaging it from the toothed portion 15. The spring 18 immediately forces the brake rod forward, which releases the brakes and the trailer is now free to move in transit.

A third result accomplished by the backward sliding movement of the sliding elements of the trailer is to disengage the rollers $c$ from the tracks so as to give a slight clearance to provide a free movement of the rollers 19 (Fig. 8) on the fifth wheel track $t$. These rollers 19 are near the ends of the lock shafts $n$ (Fig. 14). Secured to the inside of the side channel sills of the trailer are the U brackets 20 (Figs. 1, 3 and 7). These brackets are adapted to straddle the rollers 21 on the extreme ends of the lock bars $n$. When these sliding elements reach the rear of their movement these rollers strike the inclined face 22 (Fig. 3) of this U bracket and this serves to raise the trailer frame just slightly with respect to the truck. This lifts the rollers $c$ off the track just sufficiently as shown in Fig. 8 so as to clear the same. The rollers 21 and the U brackets are shown inter-engaged in Fig. 12.

Figure 12:
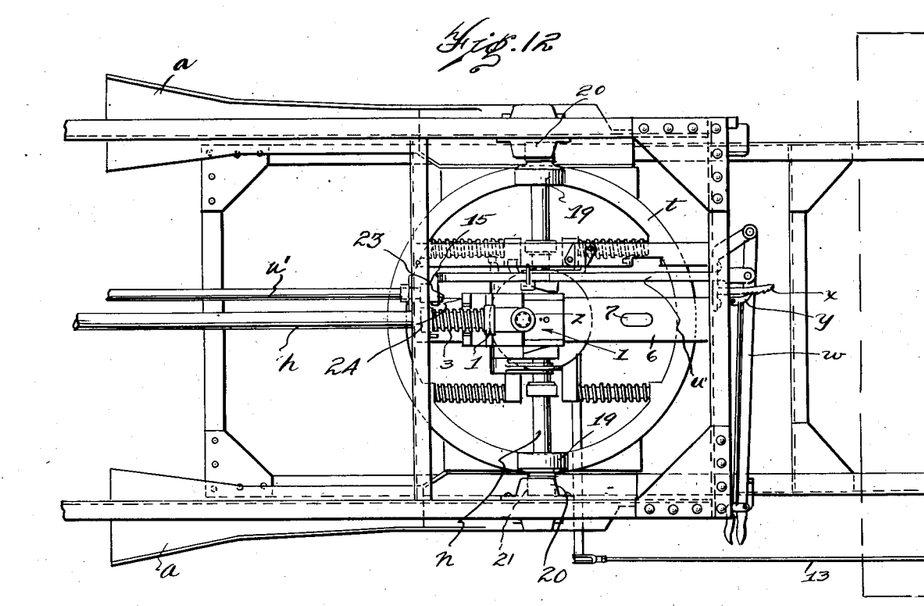
Fig. 12 is a plan view of the trailer similar to Fig. 1, but showing the trailer and the fifth wheel part of the truck after the truck is backed entirely into the trailer.

This completes the coupling and automatic operation of the devices making the truck and trailer ready for transit. It may, however, be mentioned that the brake is also arranged to be applied when the trailer attempts to override the truck. The forward end of the rear portion of the brake rod $u$ is offset as shown in Fig. 12 to provide an abutment 23, which is adapted to strike the shoulder 24 on the coupling head 1 in case the truck is suddenly slowed or stopped or the trailer suddenly accelerated, the spring 3 permitting this override action. This is a very useful function in stopping, as then of course the application of the brakes to the truck leaves the trailer perfectly free to continue on were it not for this brake. This override braking arrangement hence provides suitable brakes to stop the trailer coincidently with the application of the brakes to the truck.

We now turn to the uncoupling of the truck from the trailer. The truck driver pulls on the rod 13 (Fig. 4). This raises the stud 10, the lever 4, and in turn raises the locking pin 5 to its uppermost position shown in the dotted lines of this figure. The driver then starts the truck forward. The first thing that happens is that the depending cam 40 (Fig. 15) strikes the arm 25 on the brake rock shaft 26. This applies the brakes to permit the truck to pull away from the trailer.

The sliding elements, to wit: the sliding bar $h$ and the coupling head on the trailer, now move forward relatively with respect to the trailer which remains stationary. The lock pin 5 by reason of its tapered lower end, climbs out of the hole 8 and rides along the locking bar until it drops in the elongated slot 7 in the bar (Fig. 4). In making this relative travel forward, the sliding elements accomplish several results. One result is to automatically uncouple the latch hooks from the lock bar,—in short, uncouple the trailer from the truck. Referring to Fig. 9, it will be seen how this is accomplished. As the hooks move forward with the sliding coupling head, the tails 27 strike the lug $j$ on the bar $k$ (see also Fig. 11); this kicks the hooks up as shown in the full lines in Fig. 9, thereby permitting the locking bars $n$ to draw away. A second result accomplished by the relative travel of the sliding elements forward on the trailer is to pull the legs downwardly, as these are directly tied to the sliding bar $h$ by the links $g$.

By comparing the different parts in Fig. 9, it will be apparent that the hooks are not kicked off the locking bars until the legs have gone beyond a perpendicular position. It is only in the final travel from the perpendicular position to the slightly inclined forward final position that the hooks are thrown from the locking bars. This travel takes place by reason of the elongated slot 7 (see Fig. 4), that is,—the pin 5 drops into the rear of this slot and hence absolutely prevents the legs from folding up before the hooks are kicked off the lock bars. This absolutely prevents any accident as for instance, the legs dropping back or folding up slightly so that when the truck draws away from the tractor, the forward end of the trailer would fall. This cannot happen, as it is only by the slight amount of movement allowed by the elongated slot that the hooks are kicked off. To further prevent any accidental throwing of the hooks by any other force, it will be seen from referring to Fig. 11 that one of the hooks is provided with an upwardly projecting lug 29. This is adapted to ride along the underside of the bar $k$ so that these hooks can only be released when they are in their forward position opposite the slot 30, in the bar $k$.

Oftentimes it is desirable to back the truck and trailer. However, this would always apply the override brake except for the arrangement I have provided for blocking off the override brake on these occasions. The operator of the car need simply thrust back on the rod 13. This carries the lever 12 (Fig. 4) to the lowermost position shown in this figure. This pulls down the stud 10, which has a collar 31, which engages the tail 32 of the lever 33 and throws this lever up against the under side of the lock bars 6, so that the same is in the path of the lug 34. This provides the inner fifth wheel parts only a slight movement with respect to the outer wheel and consequently, not enough movement so that the shoulder 24 can strike the abutment 23 on the brake rod to apply the brakes.

A feature of this trailer and truck to which I desire to call attention is that there is no draft through the coupling device that is operated from the cab and which locks the sliding elements of the trailer in either forward or rear position. The draft is entirely through the locking member on the truck and the latching hooks on the trailer, and these are automatically controlled by the relative movement of the sliding parts of the trailer with respect to the trailer itself.

What I claim is:

1. In a truck and a semi-trailer, the combination of a truck provided with inclined tracks at the back, a semi-trailer frame, rollers supported on the trailer frame adapted to run up the tracks, lock bars on the truck having rollers at the ends, and U brackets depending from the trailer frame arranged to engage the rollers on the ends of the locking bars to slightly raise the trailer with respect to the truck when the truck backs clear into the trailer for the purpose of causing the rollers to clear the track.

2. In a truck and a semi-trailer, the combination of a truck provided with a locking member, a trailer frame, a sliding reach and a slidable coupling connected together and supported on the trailer frame, the latter provided with means for engaging the locking member, a swinging supporting element supported by the trailer frame, and a connection between the supporting unit and the sliding reach connecting with the supporting unit relatively close to the fulcrum.

3. In a truck and a semi-trailer, the combination of a truck provided with a locking member, a trailer frame, a sliding coupling head provided with a latching member adapted to engage the locking member on the truck, a sliding reach connected with the coupling member, a swinging supporting unit pivoted on the trailer frame, a sliding member slidable in the trailer frame and connected with the lower end of the supporting unit to act as a tension member, and a connecting link between the sliding reach and the supporting unit near its fulcrum.

4. In a truck and a semi-trailer, the combination of a truck provided with a locking member, a semi-trailer frame provided with a latching member adapted to engage the locking member on the truck but which is left out of the path of the locking member when the truck is uncoupled from the trailer, and means automatically operated for throwing the latch back into the path of the locking member when the truck backs into the trailer.

5. In a truck and a semi-trailer, the combination of a truck provided with a locking member, a semi-trailer frame provided with a latching member adapted to engage the locking member on the truck but which is left out of the path of the locking member when the truck is uncoupled from the trailer, and means automatically operated for throwing the latch back into the path of the locking member when the truck backs into the trailer operating by means of the truck lifting the trailer.

6. In a truck and a semi-trailer, the combination of a truck provided with a locking member, a trailer frame provided with a stop, a latching member on the trailer frame ordinarily left in a raised position out of the path of the locking member when the truck is uncoupled from the trailer, a sliding element in the trailer, a swinging supporting unit pivoted on the trailer frame and connected with the sliding element, the said swinging supporting element when in a supporting position being somewhat forward of a vertical position, the said latching member being held in its raised position by abutting against the stop and being also connected with the sliding element whereby when the truck backs into the trailer and raises the trailer, the swinging supporting element swings to the vertical, pulls the sliding element and the latch out of engagement with the stop and permits the latch to drop into the path of the locking member of the truck.

7. In a truck and a semi-trailer, the combination of a truck provided with a locking member, a trailer frame, a swinging gravity latch in the form of a hook having an inclined face bill, said hook arranged to slide on the trailer, a stop by which said hook is kicked up to its release position, a swinging supporting member occupying a position somewhat inclined to the vertical forward of a vertical line through its fulcrum when the same is acting as a support for the trailer frame, and connections between said swinging supporting member and the slidingly mounted hook whereby when the truck drives under the trailer and raises the same the supporting unit swings to the vertical and draws the hook away from the stop and allows the same to fall into the path of the oncoming locking member.

8. In a truck and semi-trailer, the combination of a truck provided with a locking member, a trailer frame, and a two-part coupling member provided with means for engaging the locking member, the two-part coupling member having the parts yieldably separable, and means for arresting one of the coupling members in a sliding movement that both have with respect to the trailer frame whereby the other part of the coupling member in its yielding separating action may absorb the inertia shock in arresting the relative movement.

9. In a truck and semi-trailer, the combination of a truck provided with a locking member, a trailer frame, a two-part slidable coupling having a relative sliding movement on the trailer frame, one of the parts provided with means for coupling onto the locking member of the truck, a yieldable connection between the two parts, the other parts provided with a locking pin, and means for arresting the locking pin whereby the arresting of the locking pin part of the coupling permits the other part of the coupling to separate slightly and absorb the inertia shock in arresting the relative movement of the coupling with respect to the trailer.

10. In a truck and semi-trailer, the combination of a truck provided with a locking member, a trailer frame, a locking bar provided with an opening therein, a two-part coupling slidable along the locking bar, the two-parts being held together by a spring, a locking pin on the forward part of the coupling head and a latching member secured on the rear part of the coupling head, said locking pin dropping into the opening in the locking bar when it registers therewith while the inertia of the truck and the other part of the coupling is absorbed by the springs when the yielding separation takes place between the two coupler parts when the shooting of the pin into the hole arrests one part of the coupler.

11. In a truck and semi-trailer, the combination of a trailer frame, a locking bar supported thereon with an opening at the rear and an elongated opening in the front, a sliding coupling head slidable with respect to the trailer frame, a supporting unit raised or lowered by the sliding action of the coupler, the coupler provided with a latching member arranged to be automatically released as the sliding coupler nears the completion of its forward relative movement with respect to the trailer frame, and a locking pin on the coupler arranged to engage in the rear opening of the lock bar to hold the supporting unit in its inoperative position and dropping into the elongated slot to lock the supporting unit in its operative position but permitting slight further relative movement forward for the purpose of permitting the latching member to be automatically disengaged.

12. In a truck and a semi-trailer, the combination of a trailer frame, a coupler head slidable thereon provided with a latching hook having a tail on one end, and a trip lug on the trailer frame for engaging the tail of the latch hook to throw the same for automatically releasing the hook when the coupler travels forward with respect to the trailer.

13. In a truck and a semi-trailer, the combination of a trailer frame, a sliding coupler head provided with a latching member, locking means for locking the same with respect to the trailer in its forward position and in its rear position in the sliding movement, the locking means in the forward position permitting however a certain lost motion forward but no movement backward, a trip on the trailer, said latch member striking the trip to throw the latching member to a releasing position after the forward position of the locking means sets the coupler against any backward movement but permits motion forward, and a supporting unit raised and lowered by the relative movement of the coupler head, locked in its upright position when the forward position of the locking means locks against backward sliding movement of the coupler.

14. In a truck and a semi-trailer, the combination of a truck provided with a fifth wheel carrying a locking member, a trailer frame, a coupler head slidable thereon, to effect certain operations, a locking element on the trailer frame, said coupler provided with a latching member arranged to engage the locking element in the forward and rear ends of its sliding movement, and a control member running up through the fifth wheel on the truck for disengaging the interlock between the coupler head and the locking element on the trailer.

15. In a truck and a semi-trailer, the combination of a truck provided with a fifth wheel, a trailer frame, a coupler head slidable longitudinally on the trailer frame to perform certain automatic operations, a locking bar provided with two openings for locking the coupler head at the forward and rear end of its movement, a locking pin for engaging in said openings, and a control member running up through the center of the fifth wheel for disengaging the locking pin from the opening in the lock bar when this is desired.

16. In a truck and a semi-trailer, the combination of a truck provided with a fifth wheel, a trailer frame, a locking bar provided with two openings, a slidable coupler head whose sliding movement serves to perform certain automatic operations, a pin in the coupling head for engaging in the openings to lock the coupling head in the forward or rear end of its movement, a lever on the coupling head, and a stud operating through the center of the fifth wheel which may engage the lever which is thereby swung to disengage the pin from the opening in the locking bar.

17. In a truck and a semi-trailer, the combination of a truck provided with a fifth wheel, a trailer, a sliding coupler head whose sliding movement controls certain automatic operations, means for locking the same at the forward or rear end of its movement, override brake mechanism on the trailer frame automatically operated when the trailer moves forward with respect to the truck, means for blocking such overriding action to prevent the action of the override brake, and means passing up through the fifth wheel of the truck which may be used both to disengage the locking means of the coupler head or optionally to throw in the blocking mechanism to prevent the operation of the override brake.

18. In a truck and a semi-trailer, the combination of a truck provided with a fifth wheel, a trailer frame, a sliding coupling head slidable on the trailer frame to perform certain automatic operations, means for locking the same at the rear and front of its movement, an override brake mechanism on the trailer operated to apply the brakes when the trailer overrides the truck, a stop supported on the trailer, a lever carried by the coupler head, and means passing up through the fifth wheel of the truck which may be optionally operated to disengage the locking means of the coupler head or throw the lever into the path of the stop to block the overriding of the trailer on the truck and thus prevent the operation of the overriding brake.

19. In a truck and a semi-trailer, the combination of a truck provided with a fifth wheel, a trailer frame, a slidable coupling head movable longitudinally of the trailer frame to perform certain automatic operations, a locking bar provided with a pair of openings and along which the coupler head moves, a locking pin carried by the coupler head and adapted to drop into said openings, a stop on the locking bar, a lever on the coupler, and a stud running up through the center of the fifth wheel which may be raised to disengage the locking pin from the locking bar opening and may be lowered to throw the lever into the path of the stop, and an overriding brake mechanism operated by the overriding of the trailer frame on the truck, said brake being blocked when the said lever is thrown up into the path of the stop to prevent overriding.

20. In a truck and a semi-trailer, the combination of a truck provided with a fifth wheel, a trailer having a yieldable connection through such fifth wheel of the truck, override brake mechanism operated by said trailer moving forward on such yieldable connection with respect to the truck, means for blocking such overriding action, and a control device therefor running through the center of the fifth wheel.

21. In a truck and a semi-trailer, the combination of a truck provided with a fifth wheel, a trailer having a yieldable connection with the truck through the fifth wheel, override brake mechanism on the trailer, a stop member on the trailer, a lever pivoted on the trailer which can be thrown into the path of the stop to prevent overriding action of the trailer on the truck, and a stud passing through the center of the fifth wheel by which the lever may be controlled to block said overriding action and render ineffective the overriding brakes.

22. In a truck and a semi-trailer, the combination of a truck, a trailer that may be coupled with the truck by backing into it and provided with supporting elements that are raised by the movement of the truck, a brake on the trailer, means operated by the final movement of the truck when it backs into the trailer for releasing the brakes after said supporting elements are raised.

23. In a truck and a semi-trailer, the combination of a truck, a trailer which is coupled with the truck when the truck backs into the trailer, brake mechanism on the trailer including two brake rod portions connected by a toothed segment and a toothed engagement, and means operated at the finish of the movement of the truck into the trailer for throwing the tooth out of the toothed segment to release the brakes.

24. In a truck and a semi-trailer, the combination of a truck, a trailer that is coupled to the truck when the truck backs into the trailer, brake mechanism on the trailer including a severable connection, and a sliding member on the trailer operated by the movement of the truck backward into the trailer for disengaging said severable connection to release the brakes as the truck reaches the end of its movement into the trailer.

25. In a truck and a semi-trailer, the combination of a truck, a trailer which is coupled with the truck when the truck backs into the same, brake mechanism on the trailer including a severable rod in two parts, one part of which runs through a lever with an eye, and a sliding member operated with the movement of the truck and located on the trailer adapted to engage under the lever to lift the same and break the severable connection to release the brakes.

26. In a truck and a semi-trailer, the combination of a truck provided with a locking member, a trailer frame, a coupling head having a sliding movement along the trailer frame to perform certain automatic operations, said coupler head provided with a latching member engaging with the locking member on the truck to couple it together, and means for automatically disengaging the latching member from the locking member when the coupling head approaches the extreme front of its movement.

27. In a truck and a semi-trailer, the combination of a truck provided with a locking member, a trailer frame, a sliding coupling head on the trailer frame which performs certain automatic operations by its sliding movement, a latching member on the coupler head in the form of a bellcrank hook, and a trip lug supported by the trailer frame, adapted to engage the tail of the bell crank hook when the coupling head nears the forward end of its slide to release the hook from the locking member on the truck.

28. In a truck and a semi-trailer, the combination of a truck provided with a locking member, a trailer frame, a sliding coupling head on the trailer frame, whose sliding movement performs certain operations, a latching member on the coupling head engaging the locking member and automatically released when it reaches the front of the end of the sliding movement of the coupling, and means for guarding against its release until the front end of the movement of the coupler head is reached.

29. In a truck and a semi-trailer, the combination of a truck provided with a locking member, a trailer, a coupling head slidable on the trailer to perform certain operations, a latching member carried on the coupler head, a bar supported by the trailer frame along the path of movement of the latch, and a trip supported by the bar to disengage the latch from the locking member.

30. In a truck and a semi-trailer, the combination of a truck provided with a locking member, a trailer, a coupling head slidable on the trailer to perform certain operations, a latching member carried on the coupler head, a bar supported by the trailer frame along the path of movement of the latch, and a trip supported by the bar to disengage the latch from the locking member, said bar serving to held the latch in engagement with the locking member until the latch reaches the forward end of its travel on the coupling head, the bar being provided at this point with an opening to allow the latch to release itself from the locking member.

31. In a truck and a semi-trailer, the combination of a truck, a trailer which may be coupled with the truck when the truck backs into the trailer, having sliding elements arranged to automatically uncouple the draft connections when the lock on these sliding elements is released, brakes on the trailer, and means for first automatically setting the brakes when the truck drives forward with respect to the trailer preliminary to automatically uncoupling the draft connections.

32. In a truck and a semi-trailer, the combination of a truck, a trailer which may be coupled with the truck when the truck drives into the trailer and provided with sliding elements including the coupling head on the trailer for performing certain operations and for uncoupling the draft connections between the trailer and the truck at the forward end of the sliding movement of the coupling head, a brake on the trailer, and means whereby the movement forward of the sliding elements on the trailer first automatically sets the brakes to permit the uncoupling of the draft connections.

33. In a truck and a semi-trailer, the combination of a truck, a trailer coupled to the truck when the truck backs into the trailer, a sliding coupling head on the trailer slidable to perform certain operations, means for locking the sliding coupler head at the forward end of its sliding movement, a brake on the trailer, and means tripped by the sliding elements on the trailer to apply the brake when the sliding elements move forward, the said movement forward of the sliding elements serving to first set said brakes and then to automatically uncouple the draft connections between the trailer and the truck at the forward end of the sliding movement.

34. In a truck and a semi-trailer, the combination of a truck, a trailer, a coupling member provided with two parts which have relative movement and which are connected one to the truck and one to the trailer, an override brake in the trailer arranged to engage against the coupling part attached to the truck when the trailer tends to override the truck whereby the coupling parts separate and apply the brakes.

In testimony whereof he has affixed his signature.

CHARLES H. LAND, Jr.